United States Patent [19]
Kjellqvist

[11] Patent Number: 5,323,972
[45] Date of Patent: Jun. 28, 1994

[54] BEARING SYSTEM IN A REFINER

[75] Inventor: Olof Kjellqvist, Sundsvall, Sweden

[73] Assignee: Sunds Defibrator Industries Aktiebolag, Sweden

[21] Appl. No.: 977,420
[22] PCT Filed: Sep. 11, 1991
[86] PCT No.: PCT/SE91/00599
   § 371 Date: Feb. 26, 1993
   § 102(e) Date: Feb. 26, 1993
[87] PCT Pub. No.: WO92/05874
   PCT Pub. Date: Apr. 16, 1992

[30] Foreign Application Priority Data
   Oct. 3, 1990 [SE] Sweden .................. 9003149

[51] Int. Cl.[5] .............................................. B02C 7/14
[52] U.S. Cl. ................................. 241/37; 241/259.2; 384/107; 384/121
[58] Field of Search ............ 241/37, 63, 101.2, 101.3, 241/259.2; 384/107, 111, 112, 114, 121

[56] References Cited

U.S. PATENT DOCUMENTS

| | | | |
|---|---|---|---|
| 3,977,611 | 8/1976 | Sjobom | 241/251 |
| 4,073,442 | 2/1978 | Virving | 241/37 |
| 4,402,463 | 9/1983 | Kahmann et al. | 241/37 |
| 4,454,991 | 6/1984 | Brenholdt | 241/30 |
| 4,801,099 | 1/1989 | Reinhall | 241/101.2 |
| 4,890,796 | 1/1990 | Reinhall | 241/30 |
| 4,915,510 | 4/1990 | Arvidsson | 384/99 |
| 5,067,660 | 11/1991 | Reinhall | 241/37 |

Primary Examiner—Mark Rosenbaum
Assistant Examiner—John M. Husar
Attorney, Agent, or Firm—Lerner, David, Littenberg, Krumholz & Mentlik

[57] ABSTRACT

A bearing system in a refiner for making pulp, where the raw material is refined in a refining gap between at least one pair of refining members (22, 24) rotating relative to one another, where at least one of said refining members (24) is supported by an axially movable and rotary shaft (26). The bearing system comprises a combined hydrostatic/hydrodynamic axial bearing arrangement and consists of a cylindric housing (32) with at least one rotary cylindric piston (30), which is mounted on the rotary shaft (26) for rotating together with the same. At least one outer and one inner concentric ring cylinder (200, 202 and, respectively, 210, 212) are arranged to abut one of the end surfaces of the rotary piston (30), so that a sealing gap is formed. The inner and the outer ring cylinder are axially movable but not rotary and are supported by a stationary ring piston (29 and, respectively, 33) located between said ring cylinders, and the area of the cavity (213 and, respectively, 214) formed between the inner and the outer ring cylinder is greater toward the ring piston (29 and, respectively, 33) than toward the end surface of the rotary piston (30). Channels (246 and, respectively, 248) are provided for supplying said cavity with a hydraulic pressure medium.

14 Claims, 2 Drawing Sheets

BEARING SYSTEM IN A REFINER

FIELD OF THE INVENTION

The present invention relates to bearing systems for use in refiners or grinders for pulp suspensions and the like. More, particularly, the present invention relates to bearing systems for use in refiners which include a pair of opposed refining members which are axially adjustable and rotatable relative to each other thus defining a refining gap therebetween through which the pulp or raw material is passed.

BACKGROUND OF THE INVENTION

In connection with refiners or grinders which have relatively rotatable refining members defining a refining gap, during passage of the raw material or pulp through that gap, considerable axial forces are produced which act against the refining members which have been set at desired refining gap distances therebetween. This invention thus precisely relates to a refiner of the rotating disc type for refining papermaking pulp and the like in which the raw material which is to be refined or treated in some way is passed through such a refining gap defined by a pair of axially adjustable refining discs rotating relative to each other. These refining discs thus rotate relative to each other in a plane which is perpendicular to the shafts associated therewith. Thus, at least one of the refining discs is axially adjustable and mounted on a rotary shaft, which, in turn, in response to the pressure acting on the disc itself, is axially movable with the adjustable refining disc. The pulp or raw material itself can be wooden chips, bagasse, fiber suspensions or similar-type materials which are fed to the central portion of the refining gap, through which this material is radially accelerated by the action of centrifugal force generated by rotation of the discs themselves. The thus-processed material is then discharged after the refining operation through a peripheral opening between the discs into a surrounding casing.

Axial movement of the rotary shaft must be controlled in order to maintain the predetermined refining gap between the refining discs. The size of the gap varies depending upon the intended use of the refiner. In conventional pulp refiners, for example, the gap normally has a dimension of between about 0.1 and 1 mm, while in refiners for waste paper the gap size can be as large as about 2.5 min. In connection with other applications, the refining gap may be as small as about 0.05 mm. Pulp refiners of this type are disclosed in U.S. Pat. Nos. 4,082,233; 4,253,233; 4,283,016; 4,378,092; and 4,801,099.

The rapid acceleration of material through the narrow refining gap creates axial pressure forces, which tend to separate the refining discs from each other, thereby widening the refining gap, as a result of which the efficiency of the refiner can be seriously deteriorated.

When the refiners or grinders are part of a closed or pressurized system, for example, where they are used in the treatment of a liquid slurry, additional forces must be supplied to the drive mechanism which are greater than the axial pressure forces acting upon the discs. This additional force is required not only to drive the discs in order to obtain the desired refining or grinding, but also to drive the discs against the liquid friction or hydraulic brake forces acting on the discs, so that additional axial load variations on the rotary shaft are obtained.

When the effect of these forces on the axial position of the rotary shaft are not effectively controlled, the refiner will break down. Furthermore, the resistance against these pressure forces increases substantially with increasing diameter of the discs.

Because of the increasing demand of refining systems having high capacities, which thus require large diameter refining discs, for example of the magnitude of 150 cm or greater, the absorption of these axial pressure forces has become a widely recognized problem.

Newly developed refiners have a disc diameter of between about 165 and 170 cm, a rotational speed of between about 1500 and 3600 rpm, and a power of between about 15,000 and 50,000 kW.

In order to better appreciate the enormous axial loads or pressure forces which are acting on the rotating shaft, one can imagine that a disc with a diameter of 150 cm rotating at 1,800 rpm develops a centrifugal force corresponding to about 2,800 g, which force then accelerates the material through the refining gap. This centrifugal force can apply an axial load of about 100 tons to the shaft itself, which load must therefore be taken up by the bearing structure. At a refining disc speed which is twice as high, i.e., of 3,600 rpm, the centrifugal force increases by a factor of four, according to Newton's law of force and motion. The centrifugal force thus increases to about 11,200 g, in which case the axial load on the rotating shaft can increase to about 200 to 400 tons. In connection with present bearing designs, such abnormally high axial loads must be distributed by use of a complicated bearing system, which requires a plurality of bearings and servomotors, with a resulting increase in the dimensions, as well as in the manufacturing costs of the refiner.

One example of a bearing structure of the aforesaid type is shown in U.S. Pat. No. 3,717,308, which discloses a bearing system with combined axial and radial bearings supporting the rotating shaft. Each of these bearings is coupled to a servomotor for taking up the axial pressure forces acting on the rotating shaft. Other examples of such bearing designs are shown in U.S. Pat. Nos. 4,118,800; 3,212,721; 4,073,422; and 3,276,701. U.S. Pat. No. 4,402,463 proposes yet another solution of the aforesaid problems.

The common feature of the state of art as set forth in the patents referred to above is that the hydraulic pistons in the servomotors for thrust bearings are non-rotary. U.S. Pat. No. 4,801,099 (Reinhall), however, proposes the use of one or more hydraulic rotational pistons, which are rigidly connected to the rotary shaft, and which entirely replace present systems with expensive and complicated axial, roller and/or block bearing systems. The bearing system utilizing rotating pistons according to Reinhall comprises one or more cylinder pistons mounted on the rotary shaft for rotating along with the shaft in a pressure chamber, which is formed in a stationary cylindrical housing, in which the piston(s) can be axially displaced. In this patent the axial piston displacement takes place by means of a pressure medium, which is supplied to at least one end of the piston(s) in a controlled manner, in order to continuously counteract the varying axial pressure forces acting on the movable rotary shaft, and in order to maintain the predetermined size of the refining gap.

This system, however, requires a plurality of sealing devices located at the inlets of the rotary shaft in the stationary cylindrical pressure housing as well as between the circumference of the rotating piston and the cylinder housing for its operation. These circumferential sealing devices are exposed to the vibrations of the rotating shaft which are caused by the bias of the refining elements and/or by the non-uniform distribution of the material over the surface of the refining elements. In order to prevent breakdowns, it is therefore necessary to maintain relatively large radial gaps at these sealing surfaces. The size of these gaps must therefore exceed the magnitude of the maximum radial vibrations. As a result, substantial amounts of the pressure medium supplied to the piston housing are lost as leakage through the radial sealing gaps. Furthermore, at the necessarily high relative hydraulic pressures of from about 100 to 400 bar, considerable energy and large, expensive pump installations are required.

SUMMARY OF THE INVENTION

In accordance with the present invention, these and other deficiencies have now been overcome. In particular, in accordance with this invention, a significant portion of this leakage has been eliminated and is not required for the axial balancing and control of the rotating shaft. According to this invention, this is achieved by transferring all of the sealing surfaces which are required from locations on the circumference of the shaft and piston to one or more radial planes on the end surfaces of the rotating piston. These end surfaces are thus not significantly affected by the radial vibrations of the rotating shaft caused by the bias of rotation, etc. Therefore, they can operate with minimal sealing gaps and without the risk of breakdown. This, in turn, results in considerably less leakage of the pressure medium supplied thereto.

According to the present invention, a bearing system is provided for use in a refiner for the refining of pulp in a refining gap between a pair of refining members, and wherein at least one of the pair of refining members is rotatably supported on an axially movable rotary shaft, the bearing system comprising rotary cylindrical piston means mounted on and rotatable with the rotary shaft, the rotary cylindrical piston means including first and second outer faces, inner and outer axially movable, non-rotatable concentric ring cylinders, each including a face abutting at least one of the first and second outer faces of the rotary cylindrical piston means so as to create a space between the inner and outer axially movable, non-rotatable concentric ring cylinders and to also create a sealing gap between the faces of the inner and outer concentric ring cylinders and the rotary cylindrical piston means, stationary ring piston means mounted between and supporting the inner and outer concentric ring cylinders so as to create a cavity defined by the inner and outer concentric ring cylinders, the stationary ring piston means, and the rotary cylindrical piston means, the cavity having a first portion and a second portion, the first portion of the cavity being adjacent to the rotary cylindrical means and the second portion of the cavity being adjacent to the stationary ring piston means, the second portion of the cavity being larger than the first portion of the cavity, and pressure medium supply means for supplying a pressure medium to the cavity. Preferably, the bearing system is contained within a cylindrical housing.

In accordance with a preferred embodiment of the bearing system of the present invention, the inner and outer axial movable, non-rotatable concentric ring cylinders comprise a first pair of inner and outer axially movable, non-rotatable concentric ring cylinders abutting the first outer face of the rotary cylindrical piston means, and the system includes a second pair of inner and outer axially movable, non-rotatable concentric ring cylinders abutting the second outer face of the rotary cylindrical piston means.

In accordance with another embodiment of the bearing piston of the present invention, the bearing system includes biasing means, urging the inner and outer concentric ring cylinders against the rotary cylindrical piston means so as to ensure contact therebetween. Preferably, the biasing means comprise spring-loaded biasing means, such as a plurality of spring members. In a preferred embodiment, each of the inner and outer concentric ring cylinders includes a stepped portion, and each of the plurality of spring members abuts against the stepped portion of the inner and outer concentric ring cylinders so as to urge the inner and outer concentric ring cylinders against the rotary cylindrical piston means.

In accordance with another embodiment of the bearing system of the present invention, the bearing system includes pressure medium control means for controlling the pressure supplied by the pressure medium supply means to the cavity, the pressure medium control means including scanning means for scanning the axial position of the rotary shaft whereby the axial position of the rotary shaft may be maintained substantially constant by the pressure medium control means.

In accordance with a preferred embodiment of the bearing system of the present invention, in which first and second pairs of inner and outer concentric ring cylinders are utilized, each of these first and second pairs of inner and outer concentric ring cylinders is separately and independently axially movable. In another embodiment each of the first and second pair of inner and outer concentric ring cylinders is interconnected to form a single unit.

In accordance with another embodiment of the bearing system of the present invention, the inner and outer concentric ring cylinders include passage means for providing fluid communication between the cavity and the sealing gap formed between the faces of the inner and outer concentric ring cylinders and the rotary cylindrical piston means. Preferably, the faces of the inner and outer concentric ring cylinders include groove means, and the passage means communicates with the groove means. In a preferred embodiment this bearing system includes flow resistance means associated with the passage means, preferably comprising a bend maintained in the passage means.

BRIEF DESCRIPTION OF THE DRAWINGS

The following detailed description of the present invention may be better understood with reference to the drawings, in which.

DETAILED DESCRIPTION

Figure 1:
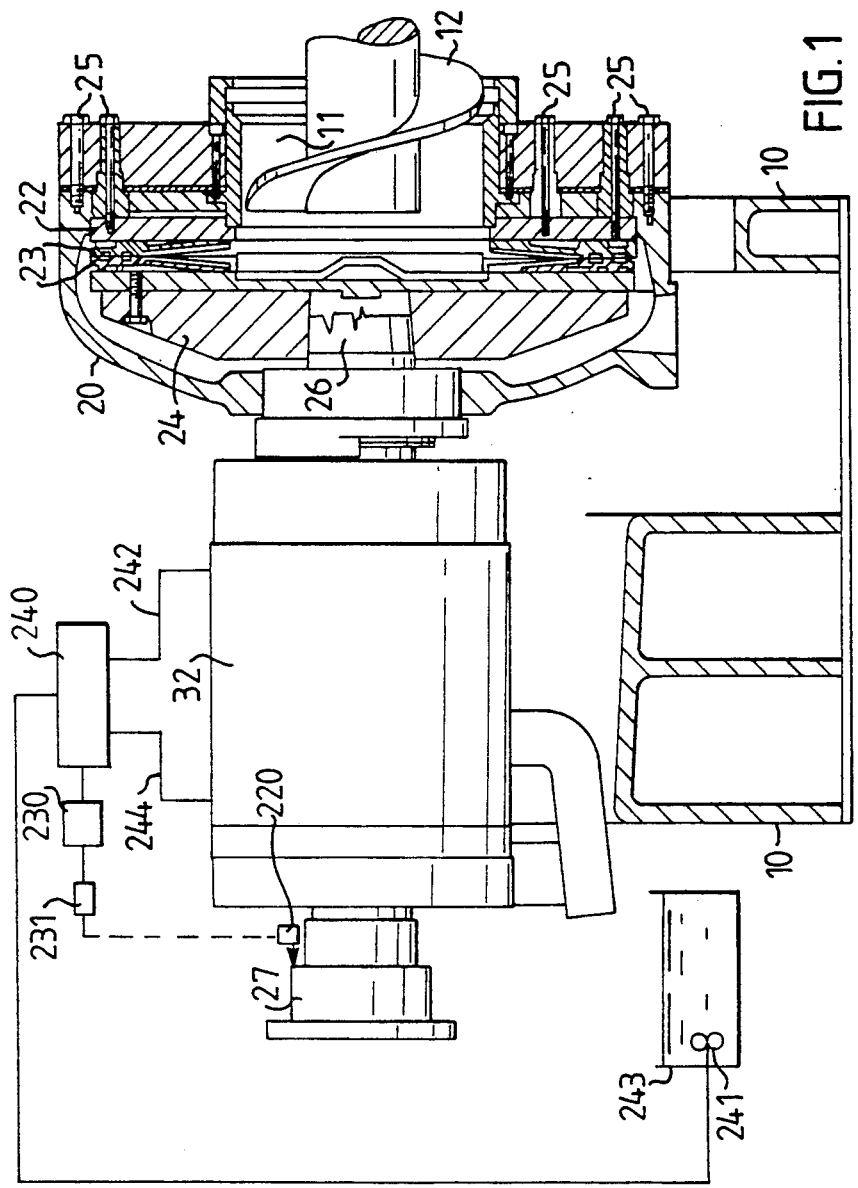
FIG. 1 is a side, elevational, partially sectional view of a refiner for use in accordance with the present invention.
Figure 2:
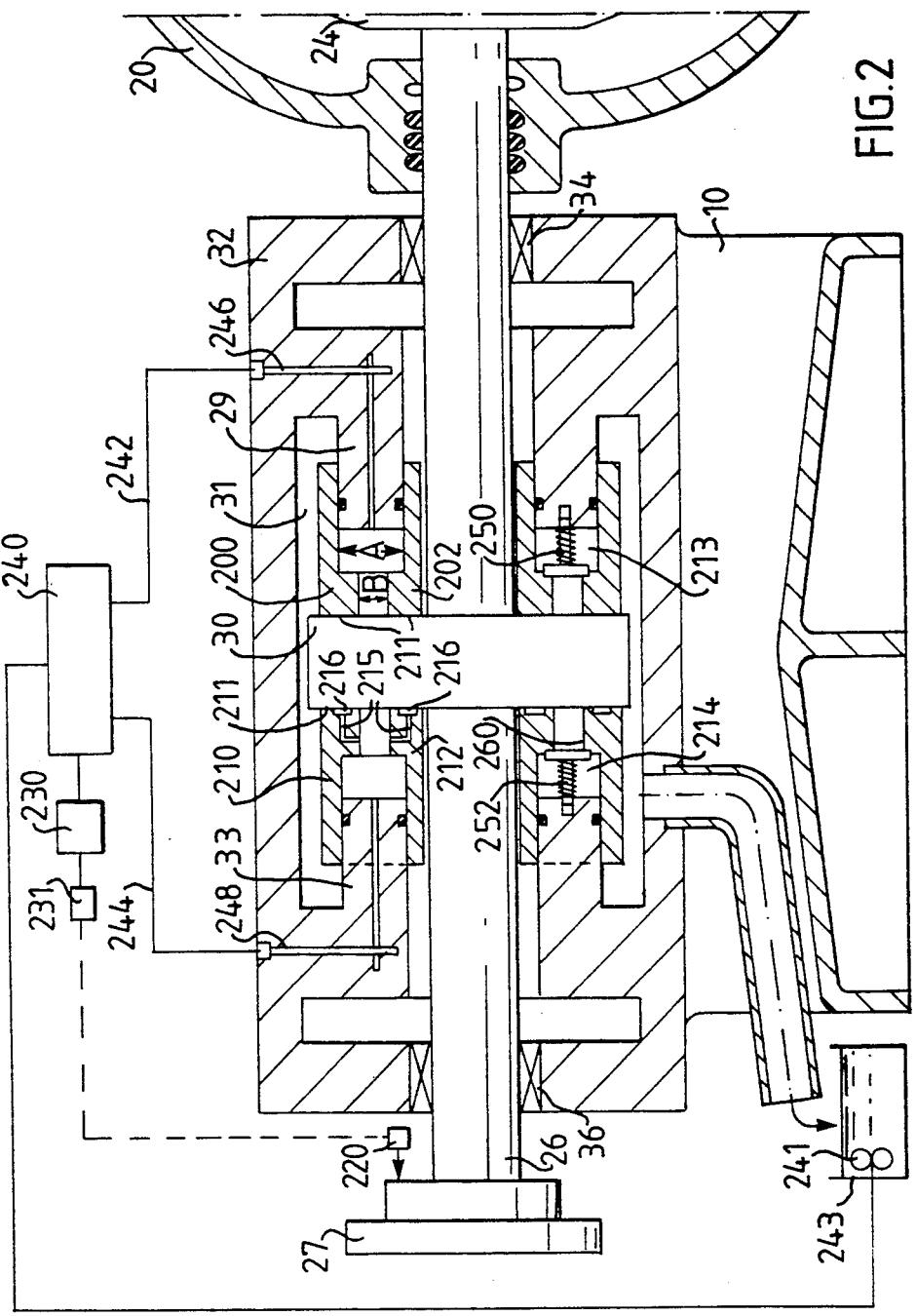
FIG. 2 is a side, elevational, partially sectional view of a hydraulic axial bearing system in accordance with the present invention in combination with conventional radial bearings, which movably support the rotatable shaft.

Referring first to the Figures, in which like numerals refer to like portions thereof, the embodiment shown in FIGS. 1 and 2 comprises a stand 10, on which an axially movable shaft 26 is mounted on two bearing elements 34 and 36. Bearing elements 34 and 36 can be slide bearings, roller bearings, axially movable radial roller bearings, or the like. One end 27 of the shaft 26 is arranged to be driven by a motor (not shown). The other end of the shaft 26 supports a rotary adjustable disc 24 and a refining gap is defined between that rotary disc 24 and a stationary disc 22. Both of these discs are provided with conventional refining segments 23.

Refining discs 22 and 24 are enclosed in a refiner casing 20, in which the stationary disc 22 is mounted by means of bolts 25. The raw material which is to be processed therein is fed through an opening 11 by means of a conventional feed worm 12, and is then introduced into the refining gap through a central opening in the stationary disc 22. Bearing elements 34 and 36 are supported by a bearing housing 32, which forms a cylindrical space 31 between the two bearing elements 34 and 36, as well as two ring pistons 29 and 33, which are directed axially against each other. On these ring pistons 29 and 33, outer ring cylinders 200 and 210 and inner ring cylinders 202 and 212 are located. These rings cylinders are axially movable, but are not rotary along the ring pistons 29 and 33. The outer ring cylinders 200 and 210 are movable along the outer surface of the respective ring pistons 29 and 33, and the inner ring cylinders 202 and 212 are movable along the inner surface of the respective ring piston 29 or 33. Between the opposed ring pistons 29 and 33, a rotary cylindrical piston 30 is located. This piston 30 is mounted on the shaft 26 to rotate together with the same. The ring cylinders abut the end surfaces of the rotary piston 30, so that sealing gaps 211 are formed between the ring cylinders and these end surfaces. The ring cylinders are thus formed with a sealing surface which connects them to the radial end surfaces of the piston 30.

Between the outer and inner ring cylinder 200 and 202 and 210 and 212, respectively, cavities 213 and 214, respectively, are defined, which on one side are defined by ring pistons 29 and 33, respectively, and on the other side by rotary piston 30. These ring cylinders are formed so that the area of the cavity is greater than the area B toward or adjacent to the rotary piston 30. In order to supply a hydraulic pressure medium to cavities 213 and 214, channels 246 and 248, respectively, are provided. The differences between areas A and B are provided so that adaptation of the ring cylinders to the rotary piston 30 by means of the hydraulic pressure medium within the cavity balances the hydraulic pressure drop in the sealing gap 211. The space 31 outside of the rotary piston is preferably at atmospheric pressure.

The axial position of the rotary piston 30 is controlled and adjusted by axial movement of the two non-rotary, but axially movable, ring cylinders 200 and 210. Movement of the ring cylinders 200 and 202 and 210 and 212, respectively, and the force by which the hydraulic pressure maintained in the cavities 213 and 214 acts on the rotary piston 30, is determined by means of a sensing device 220, which senses the axial position of the shaft 26. In the embodiment shown in FIG. 2, the sensing device 220 is located outside the bearing housing 32. Alternatively, however, this device can be placed in the cylindrical space 31, and can sense the position of the shaft by indicating the position of outer ring cylinder 200 and 210. A hydraulic control valve 240 is controlled by servomotor 230, and adjustment device 231. The control valve 240 distributes and controls the pressure of the hydraulic medium through channels 242, 244, 246, and 248 to the respective cavity 213 or 214, so that the axial position of the rotary shaft is maintained constant in spite of varying axial shaft loads. These load variations originate from the refining member 24, as well as from the sub-atmospheric or super-atmospheric pressure maintained or varying within the refining housing 20.

By varying the relationship between the area A adjacent to the ring pistons 29 and 33, and the outlet area B of the cavity 213 and 214 adjacent to the rotary piston 30, the contact pressure against the piston, and thus the size of the sealing gap 211, can be increased or reduced, thereby correspondingly varying the amount of leakage through the gap 211. Normal leakage in a refiner according to the present invention would thus be below about 5 1/min, compared with previous hydraulic piston bearings or block bearings, which normally require between about 50 and 200 1/min for corresponding applications. The present invention thus eliminates the inherent disadvantages of expensive pump and control equipment, while saving pump energy corresponding to reduced demand of the hydraulic medium.

One or more of the ring cylinders 200, 202, 210 and 212 can be provided with one or more passageways 215 which extend from the cavity 213 or 214, to the sealing gap 211 between the particular ring cylinder(s) and the rotary piston 30. The passageway preferably opens into an overall groove 216 in the surface of the ring cylinder which abuts the rotary piston 30. This groove 216 is intended to bring about uniform distribution of the pressure medium. The passageway 215 is preferably formed with means for effecting flow resistance or restriction, for example in the form of a sharp bend. By utilizing this arrangement, a suitable pressure drop can be obtained during operation, whereby the size of the sealing gap 211 can be reliably maintained, and metallic contact between the sealing surfaces can thus be prevented.

In order to ensure that the ring cylinders 200, 202, 210 and 212 but the end surfaces of the rotary piston 30 at the start, i.e., before full hydraulic pressure has been achieved, the ring cylinders can be spring-loaded against the rotary piston 30. A number of spring means, preferably four, for example, can be placed between each ring piston 29 and 30, respectively, and steps 260 in the inner and outer ring cylinder 200 and 202, and 210 and 212, respectively.

According to another embodiment of this invention, the outer and inner ring cylinders 200 and 202, and 210 and 212, respectively, are connected with each other by spokes or the like at that portion of the ring cylinders which is located closest to the rotating piston 30. In this manner, a uniform sealing gap 211 is ensured at the outer and inner ring cylinders.

The sealing surfaces forming the sealing gap 211 are preferably planar, but can also be wedge-shaped in the direction of the radius, curved, etc.

In the embodiment shown in the Figures, the bearing system is formed with a ring piston and associated ring cylinders on both sides of the rotary piston 30. It is possible, however, to place ring cylinders on only one side, e.g., on that side of the rotary piston which is remote from the associated refining disc.

Different combinations of the bearing system according to the present invention with different types of radial bearings can also be imagined. For example, instead of placing one radial bearing on each side of the bearing housing 32, two radial bearings can be placed outside or inside the bearing housing, as seen in axial direction. Instead of conventional radial bearings, other types of bearings can also be utilized, such as slide bearings, combined axial-radial bearings, etc.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A bearing system for use in a refiner for the refining of pulp in a refining gap between a pair of refining members and wherein at least one of said pair of refining members is rotatably supported on an axially movable rotary shaft, said bearing system comprising rotary cylindrical piston means mounted on and rotatable with said rotary shaft, said rotary cylindrical piston means including first and second outer faces, inner and outer axially movable, non-rotatable concentric ring cylinders each including a face abutting at least one of said first and said second outer faces of said rotary cylindrical piston means so as to create a space between said inner and outer axially movable non-rotatable concentric ring cylinders and to also create a sealing gap between said faces of said inner and outer concentric ring cylinders and said rotary cylindrical piston means, stationary ring piston means mounted between and supporting said inner and outer concentric ring cylinders so as to create a cavity defined by said inner and outer concentric ring cylinders, said stationary ring piston means, and said rotary cylindrical piston means, said cavity having a first portion and a second portion, said first portion of said cavity being adjacent to said rotary cylindrical piston means and said second portion of said cavity being adjacent to said stationary ring piston means, said second portion of said cavity being larger than said first portion of said cavity, and pressure medium supply means for supplying a pressure medium to said cavity.

2. The bearing system of claim 1 wherein said bearing system is contained within a cylindrical housing.

3. The bearing system of claim 2 wherein said inner and outer axially movable, non-rotatable concentric ring cylinders comprise a first pair of inner and outer axially movable, non-rotatable concentric ring cylinders abutting said first outer face of said rotary cylindrical piston means, and including a second pair of inner and outer axially movable non-rotatable concentric ring cylinders abutting said second outer face of said rotary cylindrical piston means.

4. The bearing system of claim 3 wherein each of said first and second pair of inner and outer concentric ring cylinders is separately and independently axially movable.

5. The bearing system of claim 3 wherein each of said first and second pair of inner and outer concentric ring cylinders is interconnected to form a single unit.

6. The bearing system of claim 1 including biasing mans, said biasing means urging said inner and outer concentric ring cylinders against said rotary cylindrical piston means so as to ensure contact therebetween.

7. The bearing system of claim 6 wherein said biasing means comprises spring loaded biasing means.

8. The bearing system of claim 7 wherein said spring loaded biasing means comprises a plurality of spring members.

9. The bearing system of claim 8 wherein each of said inner and outer concentric ring cylinders includes a stepped portion, and wherein each of said plurality of spring members abuts against said stepped portion of said inner and outer concentric ring cylinders so as to urge said inner and outer concentric ring cylinders against said rotary cylindrical piston means.

10. The bearing system of claim 1 including pressure medium control means for controlling the pressure supplied by said pressure medium supply means to said cavity, said pressure medium control means including scanning means for scanning the axial position of said rotary shaft whereby said axial position of said rotary shaft may be maintained constant by said pressure medium control means.

11. The bearing system of claim 1 wherein said inner and outer concentric ring cylinders include passage means for providing fluid communication between said cavity and said sealing gap formed between said faces of said inner and outer concentric ring cylinders and said rotary cylindrical piston means.

12. The bearing system of claim 11 wherein said faces of said inner and outer concentric ring cylinders include groove means, and wherein said passage means communicates with said groove means.

13. The bearing system of claim 12 including flow resistance means associated with said passage means.

14. The bearing system of claim 13 wherein said flow resistance means comprises a bend maintained in said passage means.

* * * * *

UNITED STATES PATENT AND TRADEMARK OFFICE
CERTIFICATE OF CORRECTION

PATENT NO. : 5,323,972
DATED : June 28, 1994
INVENTOR(S) : Olof Kjellqvist

It is certified that error appears in the above-identified patent and that said Letters Patent is hereby corrected as shown below:

Column 8, line 15 delete "mans" and insert therefor --means--.

Signed and Sealed this

Twentieth Day of September, 1994

Attest:

BRUCE LEHMAN

Attesting Officer          Commissioner of Patents and Trademarks